Dec. 14, 1965  A. F. MARTZ, JR  3,223,108
CONTROL FOR LAUNDRY APPARATUS
Filed Aug. 21, 1962  2 Sheets-Sheet 1

INVENTOR.
Arthur F. Martz, Jr.,
BY
Hofgren, Brady, Wegner,
Allen & Stellman Attys.

United States Patent Office 3,223,108
Patented Dec. 14, 1965

3,223,108
CONTROL FOR LAUNDRY APPARATUS
Arthur F. Martz, Jr., Princeton, N.J., assignor to Whirlpool Corporation, a corporation of Delaware
Filed Aug. 21, 1962, Ser. No. 218,247
9 Claims. (Cl. 137—93)

This invention relates to a control apparatus and more specifically to an apparatus for controlling the characteristics of wash and rinse liquids of an automatic washing machine as a function of the relative conductivities of the liquids.

Automatic washing machines in the past several years have been designed with many automatic features directed toward improving the washing and rinsing efficiency and at the same time simplifying the operation thereof. A particularly difficult problem is encountered, however, in attempting to automatically provide the dispensing detergent therein, as the optimum amount of detergent required is dependent upon the hardness of the water used. While it would be possible to make adjustments of the machines in each installation for the particular hardness of the water actually to be used, this would require hardness tests, etc., which are difficult and troublesome. A further complication may arise, as many homes utilize washing machines in conjunction with water softeners wherein the hardness of water varies depending upon the length of use of the softening material therein.

It is, therefore, a feature of this invention to provide an apparatus for automatically controlling the addition and removal of detergent in a washing machine, which control is a function of the hardness of the water utilized therein.

A further feature of this invention is the provision of a means for measuring the conductivity of the liquid in a washing machine to control the supply of detergent to the machine.

Yet another feature of the invention is the provision of an automatic control for the rinse cycle of an automatic washing machine wherein the amount of detergent removed is determined by a preselected constant value of the conductivity of the laundry water utilized therein.

It is a still further feature of this invention to provide an apparatus for automatically controlling the amount of detergent added to a washing machine as a function of the hardness of the supply water and controlling the degree of rinse as a function of the conductivity of the laundry water.

Another feature of this invention is to provide an improved control circuitry including a plurality of sensing means for measuring the conductivity of supply water and the laundry water within a washing machine to control specific cycles of operation of the machine in relation to the degree of hardness of the supply water.

Further objects and advantages will become apparent from the following detailed description taken in connection with the accompanying drawings wherein.

Figure 1:
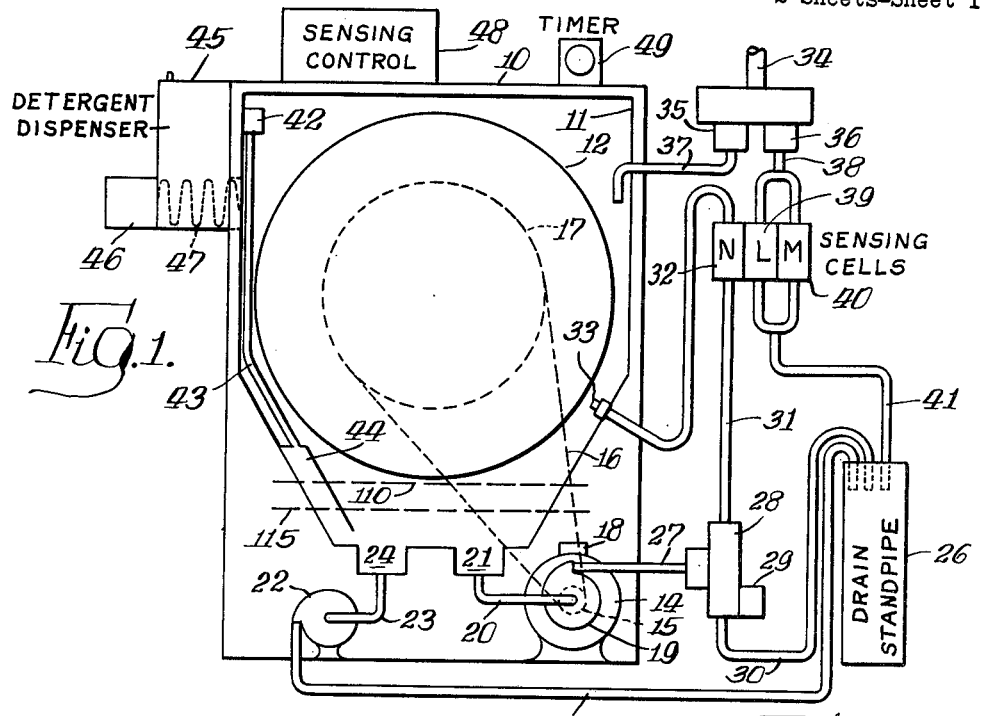
FIGURE 1 shows a washing machine provided with a control embodying the invention.

In the illustrative embodiment of the invention disclosed in the drawing, an automatic washer of generally conventional construction is shown to include a cabinet 10, a casing 11 and a clothes containing cylinder 12 mounted for rotary motion about a horizontal axis within the cabinet. A motor drive 14 drives a pulley 15 which rotates the cylinder 12 through a drive belt 16 and a drive pulley 17. Associated with motor drive 14 is a spin solenoid 18 controlling the motor drive to vary the speed of rotation of cylinder 12.

A pump 19 is coupled through a pipe 20 to a sump 21 and a purge pump 22 is coupled through a pipe 23 to a second sump 24. Pumps 19 and 22 serve to cycle the laundry liquids to the washer and to remove the liquids at certain times in the operation of the machine. Purge pump 22 delivers liquid through a pipe 25 to a drain stand pipe 26. Pump 19 delivers the laundry liquid through a pipe 27 to a two-way valve 28 actuated by a solenoid 29 to route the laundry liquid either through a pipe 30 to the drain stand pipe 26 or through a pipe 31 through a first sensing device 32 to a spray nozzle 33 directing the liquid into the cylinder 12.

A pipe 34 coupled to a source of supply water (not shown) is connected to a pair of solenoids 35 and 36 which control flow of the supply water through a pipe 37 to the washing machine and through a pipe 38 to a pair of sensing cells 39 and 40. The output of the sensing cells 39 and 40 is coupled through a pipe 41 to drain pipe 26. Control of the amount of laundry liquid in the machine is effected by an air pressure actuated water level switch 42 coupled through a pipe 43 to a pressure dome 44 open at its lower end to be actuated by the pressure of the laundry liquid in the washing machine.

The washing machine is further provided with a detergent dispenser 45 including a motor 46 driving a feed screw 47 through an opening in the side of the washing machine to dispense detergent from the supply to the laundry liquid therein. A sensing control 48 and a timer 49 are provided to control the various steps of operation as hereinafter discussed.

Figure 4:
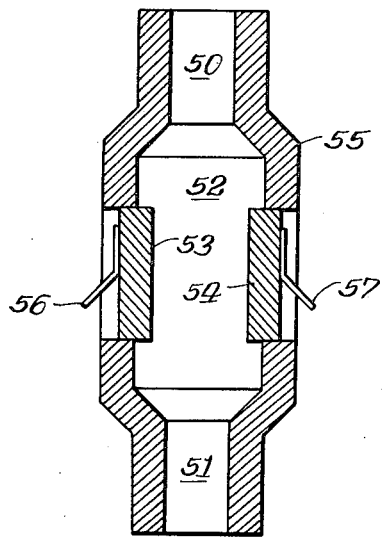
FIGURE 4 is a vertical section of a sensing cell utilized in the control.

The structure of each of the sensing cells 32, 39 and 40 is similar, the structure of cell 32 being shown in detail in FIGURE 4 to include an inlet port 50, outlet port 51, an enlarged central section 52 and a pair of spaced, opposed electrode plates 53 and 54. The housing 55 is formed of an insulating material and maintains the electrode plates 53 and 54 electrically isolated from each other. When water is passed through the chamber 52 and a voltage is applied to the electrode plates 53 and 54 through a pair of leads 56 and 57, a current flows through the water, the magnitude of which is a function of the conductivity of the water, which is inversely proportional to the hardness of the water.

Figure 5:
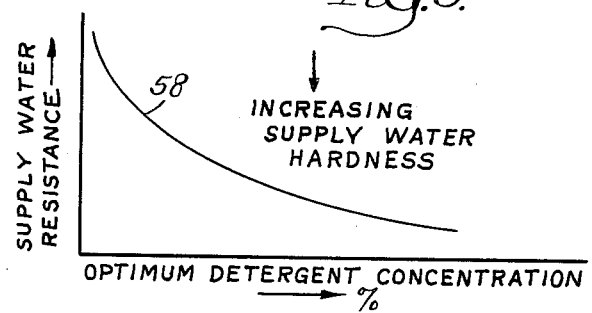
FIGURE 5 is a graph showing optimum detergent concentrations for supply water of different hardnesses.

FIGURE 5 shows the optimum detergent concentration, for washing fabric and the like in the washing machine, as a non-linear function of the resistance, and thus the hardness, of the supply water used. The resistance of the supply water increases with a decreasing hardness of water, and thus less detergent is needed as the softness of the water increases, as shown by line 58 of the graph.

Figure 6:
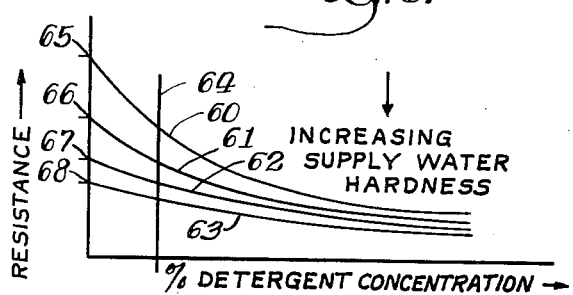
FIGURE 6 is a graph showing percent detergent concentrations versus electrical resistance for supply water of different hardnesses.

FIGURE 6 graphically illustrates the non-linear relationship between the resistance of the rinse water and the percentage of detergent concentration in the rinse water for supply waters having different hardnesses as shown by the respective curves 60, 61, 62 and 63. A vertical line 64 intersecting this family of curves indicates the preselected concentration of detergent in the laundry water which causes sensing device 32 to fire trigger device 101 and effectively terminate the rinse portion of the machine cycle. It can be seen that with soft water a different resistance is measured for a given percentage of detergent concentration in the diluted laundry water than with hard water.

Figure 2:
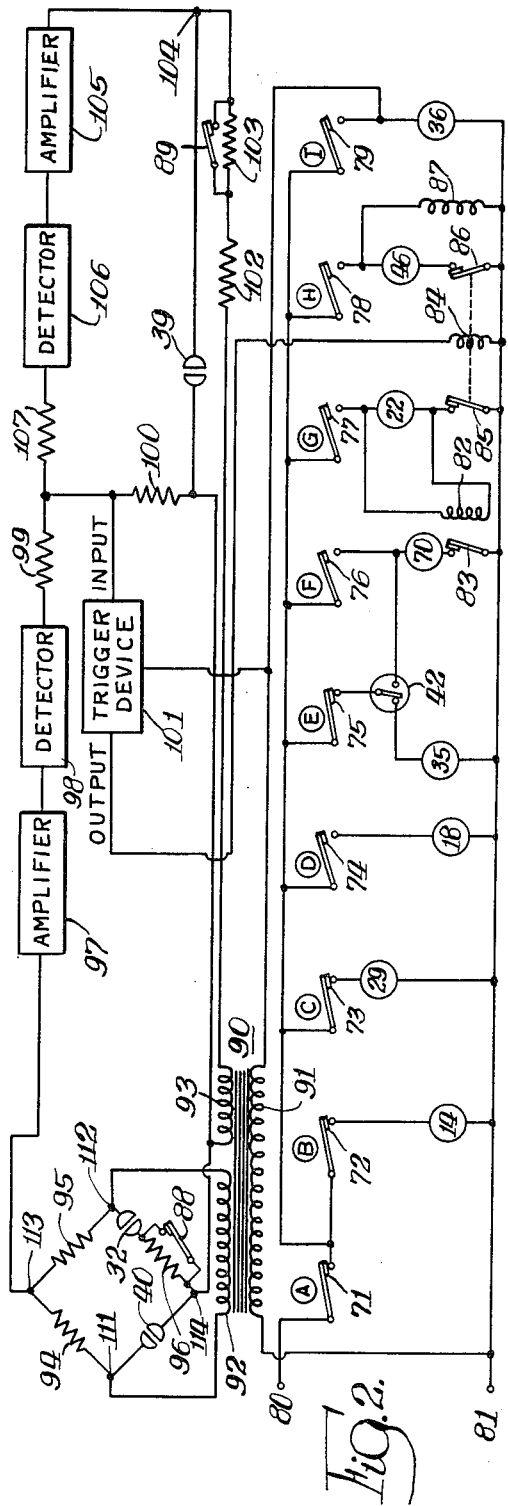
FIGURE 2 is a schematic circuit diagram of the control.

FIGURE 2 shows the electrical circuitry of the timer 49 and the sensing control 48 of FIGURE 1. As shown, a timer motor 70 drives a series of cams A, B, C, D, E, F, G, H and I which actuates a series of switches 71 through 79 for supplying power from a pair of supply lines 80 and 81 to the electrical apparatus of the washing machine. Conventionally, the supply may be a 60 cycle 115 volt supply. The control further includes a relay 82 actuating switch 83, a relay 84 actuating switches 85 and 86, and a relay 87 actuating normally closed switch 88 and normally open switch 89 of the control circuit.

Power is supplied to the control circuit 48 through a transformer 90 having a primary winding 91 and a pair of secondary windings 92 and 93. The primary winding 91 has one end thereof connected to line 81 and the other end connected between the supply water sample valve 36 and switch 79 actuated by cam I so that when switch 79 is closed, current flows through primary winding 91. Secondary winding 92 is connected across a bridge circuit including a resistor 94, a resistor 95, sensing units 32 and 40, and a resistor 96 in series with sensing unit 32. The output of the bridge circuit is coupled to an amplifier 97 whose output is fed through a rectifier 98 having a load resistor 99 connected in series with a resistor 100. A trigger device, which may be either a silicon control rectifier or a thyratron tube 101, but not limited thereto, receives an input signal from resistor 100 and switches to an "on" condition under predetermined voltage conditions across resistor 100 to actuate relay 84.

In addition, the secondary winding 93 of transformer 90 is connected to a series load circuit including a pair of resistors 102 and 103, and sensing device 39. The signal developed in this load circuit at a point 104 between resistor 103 and sensing device 39 is coupled through an amplifier 105, a rectifier 106, and a load resistor 107 to resistance 100.

Figure 3:
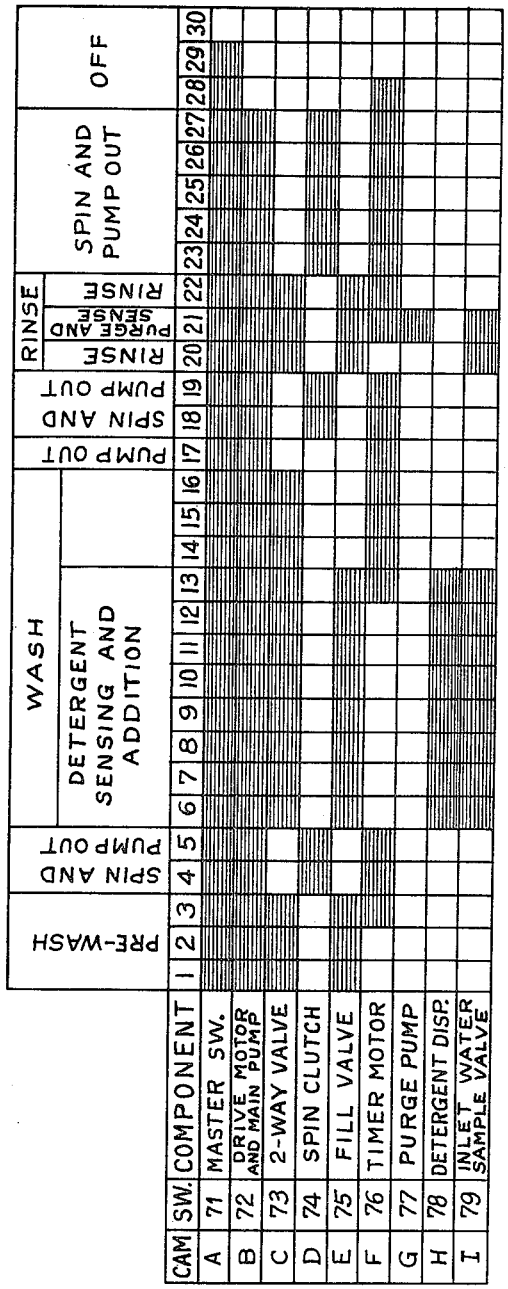
FIGURE 3 is a timer schedule illustrating the sequence of cam switch operation.

FIGURE 3 shows the operation sequence of switches 71 through 79 controlled by the timer motor cams A through I. The darkened squares represent a closed condition of the switches and the light squares represent an opened condition of the switches in the respective ones of thirty different timer steps.

In using the washing machine, the operator, after having loaded the machine with the fabrics to be washed, initiates operation by actuating the timer 49 to its start position. The pre-wash cycle of steps 1 through 3 is provided to pre-soak the clothes for removing a portion of the loose dirt therefrom. During time interval 1, switches 71, 72, 73 and 75 are closed by the cams A, B, C and E. Power is applied thereby to the drive motor 14, solenoid 29, and fill valve 35 through the pressure switch 42 which is in its leftward position at this time. Supply water is delivered to the machine until it reaches the level 110 desinated by the dashed line in FIGURE 1. This causes the pressure switch 42 to move to its rightward position whereby the fill valve solenoid 35 is de-energized. The motor 14 rotates container 12 and the clothes are pre-washed. During interval 3 power is applied to timer motor 70 through normally closed switch 83. The spin and pump out cycle follows, occurring during time intervals 4 and 5 during which switch 73 is opened by cam C, de-energizing the solenoid on the two-way valve 28 thereby allowing laundry water to be removed from the machine. Switch 74 is closed by cam D actuating the spin clutch solenoid 18. Basket 12 is rotated at a high speed and water is removed by the pump 19 through the de-energized two-way valve 28 and pipe 30 to the drain stand pipe 26.

Time intervals 6 through 16 cover the wash period and include intervals 6 to 13 during which the conductivity of the water in the machine is sensed and the amount of detergent added to the wash water is controlled. As shown, switches 71, 72, 73, 75, 78 and 79 are closed by their associated cams during time intervals 6. Concurrently, fill valve 35 admits water to the washing machine, two-way valve 28 recycles the water through the machine, detergent dispenser motor 46 is actuated and detergent from dispenser 45 is fed via the feed screw 47 into the washing machine. The closing of switch 79 actuates the supply water sample valve 36 at this time to allow water to pass through sensing devices 39 and 40 and at the same time connects the primary of transformer 90 across lines 80 and 81. Relay 87 is actuated as switch 78 is closed, switch 88 is opened and switch 89 is closed during this period. The sensing control is now conditioned to sense the conductivity of the supply water and the laundry water within the washing machine containing the delivered detergent.

The initial conductivity of the supply water sensed by sensing devices 32 and 40 produces a substantially equal resistance in the bridge circuit, since at the initial stage, substantially no detergent is present in the water in the tub. Resistance 96, in series with sensing device 32 unbalances the bridge circuit and application of the signal from secondary 92 to the points 111 and 112 of the bridge circuit causes an output to be developed in the bridge circuit between points 113 and 114. This signal is fed to amplifier 97 which in turn is coupled to rectifier 98 and a direct current is developed through resistors 99 and 100. At the same time transformer secondary 93 supplies a potential across the series circuit including resistor 102, switch 89 and sensing device 39. As the conductivity of the supply water normally remains substantially constant during the wash cycle, a substantially constant signal is produced in this series circuit with a resulting constant potential at point 104. This signal is amplified through amplifier 105, and rectifier 106 develops a direct current in its load circuit including resistor 107 and 100. The currents developed by the two rectifiers have opposing directions of flow and the resulting low potential developed across resistor 100 is below the trigger potential of device 101.

If the initial supply water is "hard" it will have a high conductivity sensed by device 39 and the current developed by rectifier 106 will be high and of a substantially constant value. The resistance sensed by devices 32 and 40 is low and since resistor 96 is in the bridge circuit an output is developed between points 113 and 114. As detergent is added, the resistance sensed by device 32 decreases and the signal developed between points 113 and 114 of the bridge circuit is reduced in magnitude with the result that the current flow through resistor 99 is decreased. Since the two currents through resistor 100 are in opposition, the net effect is to increase the potential across resistance 100. When this potential reaches the triggering potential of trigger device 101, it is switched to the on condition and current flows through relay 84 opening switches 85 and 86, thereby de-energizing the detergent dispensing motor 46.

During time interval 13, switch 76 closes and energizes timer motor 70. At the commencement of time interval 14, the switches 75, 78 and 79 are opened by their respective cams. The clothes container 12 continues to rotate, and water is pumped via pump 19 through the nozzle 33 into the clothes and the washing cycle proceeds.

The pump out cycle occurs during period 17 in which switch 73 is opened by cam C and soleniod 29 is de-energized allowing the wash water to be removed from the sump 21 via pump 19, pipe 27, valve 28 and pipe 30 to the drain stand pipe 26. Commencing with time interval 18 switch 74 closes whereby spin clutch solenoid 18 is actuated to spin the clothes container 12 at a high speed removing excess wash water not drained during the pump out period.

The rinse cycle occupies time intervals 20 21 and 22 during which the sensing control circuit is again activated to sense the conductivity of the supply water and the laundry water to reduce the detergent concentration within the laundry water by continuously diluting it with supply or rinse water until a predetermined level is reached. Switches 71, 72, 73, 75 and 79 are closed by their respective cams during the time interval 20. Fill valve 35 is actuated allowing supply or rinse water to enter the machine through pipe 37; two-way valve 29 is closed allowing the rinse water to be recycled by pump 19; the machine is driven by the drive motor 14 and the supply water sample valve 36 is actuated. Since switch 18 is open, relay 87 is de-energized closing switch 88 and opening switch 89. Thus, the sensing control circuit is conditioned to compare the conductivity of the supply water with the conductivity of the rinse water. Resistor 96 is now shorted out of the bridge circuit while resistor 103 is inserted in series with the secondary 93 and sensing device 39. The potential developed at point 104 is again a constant value and the current flow through resistance 107 is a constant value. Water is admitted into the washing machine via the fill valve, and the sensing devices 32 and 40 initially measure different values of conductivity. Device 32 measures the conductivity of the rinse water containing detergent while device 40 measures that of the incoming supply water. Thus, a signal is developed between points 113 and 114 of the bridge circuit and there is developed a direct current through resistor 99 of a value proportional to the difference in the conductivities measured. If the supply water is "soft" or has a high resistance, this signal is large, but at the same time a relatively large signal is developed at point 104 due to the high resistance measured by device 39 and the net result of the two currents flowing through resistor 100 in opposite directions is that an insufficient potential is developed to actuate trigger device 101. As the supply or rinse water continues to fill the washing machine the conductivity of the laundry water in the machine changes, the resistance increases due to decreasing the percentage of detergent present and the conductivity measured by device 32 more nearly equals that measured by device 40 and the output signal between points 113 and 114 decreases. The net signal developed across resistance 100 increases, and when sufficient rinse water has been added to reduce the detergent concentration to the desired level, trigger device 101 switches on actuating relay 84.

At the beginning of time interval 21 switches 76 and 77 are closed actuating the timer motor and purge pump 22. However, when the purge pump is energized, so is relay 82, and switch 83 is opened de-energizing the timer motor 70. Therefore, the timer motor 70 is de-energized during the entire operation of the purge pump, since differing amounts of laundry water must be removed from the machine due to different amounts of detergent being added to the laundry water during the wash portion of the cycle to reach the desired percentage of detergent concentration for a given water hardness. During interval 21, fill valve 35 supplies supply water to the machine faster than purge pump 22 can remove the diluted laundry water from sump 24. Therefore, purge pump 22 must remove laundry water from sump 24 until the laundry water reaches a level indicated by dashed line 115 in FIGURE 1 before the fill valve 35 will be energized by the action of switch 42 to its leftmost position to dilute the laundry water, as shown in FIGURE 2. Fill valve 35 supplies water to the machine, when energized by switch 42, until the water level reaches a level indicated by the dashed line 110. Switch 42 will move to its rightmost position and fill valve 35 will be de-energized. However, at this point, time motor 70 is not energized since relay 82 is holding switch 83 open. The aforementioned cycling of switch 42 continues until the trigger device 101 fires. Relay 82 is energized by trigger device 101 to open switch 85 which de-energizes purge pump 22 and relay 82 which closes switch 83 to re-energize timer motor 70. During the time period 22 of the rinse cycle, the purge pump is further deactivated by the opening of switch 77, as is the sensing control circuit.

The spin and pump out cycle occupies time intervals 23 through 27 during which the drive motor 14 and main pump 19 are actuated as are the spin clutch solenoid 18 and timer motor. Thus, the container 12 is rotated at a high speed and the water is removed from the washing machine.

The last three time periods, 28, 29 and 30 serve to shut the machine down after the washing cycle has been completed.

It is to be noted from the above description of operation of the automatic washing machine and sensing control circuit that device 39 provides a signal responsive to the conductivity of the supply water which is compared to a signal developed by the bridge circuit including devices 32 and 40. The combination of the outputs of rectifiers 98 and 106 in resistor 100, which are proportional to the sensed conductivities, develops a voltage to trigger the device 101 dependent upon the "hardness" of the water and upon the amount of detergent added during the washing cycle or the detergent concentration in the rinse water during the rinse cycle.

It is to be observed further that the rinse operation is terminated at the same percent detergent concentration as shown by line 64, independent of the value of water hardness. This is due to the fact that the bridge output voltage across points 113 and 114, when measured or calculated at a resistance corresponding to the intersection of line 64 with curves 60, 61, 62, 63 and intermediate curves, is proportional to the voltage measured or calculated at point 104, with respect to neutral, which corresponds to points 65, 66, 67, 68 and intermediate points.

During the rinsing portion of the machine cycle when the difference between the bridge output voltage and the voltage at point 104 reaches a predetermined value, equal to the trigger value, device 101 triggers and the rinsing operation is terminated. Due to the aforementioned linear relationship and the fact that the voltage at 104 is proportional to the resistance at points 65–68 and that the bridge output voltage is proportional to the resistance at points 60–63, the difference voltage will occur at different values of the bridge output voltage, but at a constant percent detergent concentration as shown by line 64 in FIGURE 6.

During the washing portion of the machine cycle or during the detergent adding operation, the linear relationship between the voltage at point 104 and the resistance corresponding to points 65–68 is destroyed by the shorting resistor 103. Therefore, the curve of FIGURE 5 results so that optimum detergent is added, since the curve is the "inverse" of the optimum detergent versus water hardness curve.

While I have shown and described one embodiment of my invention, it is to be understood that it is capable of many modifications. Changes, therefore, in the construction and arrangement may be made without departing from the spirit and scope of the invention as defined in the appended claims.

The embodiments of the invention in which an exclusive property or privilege is claimed are defined as follows:

1. In a fabric cleaning device, apparatus for controlling the concentration of a cleaning material in a fabric treating fluid therein, comprising: a first circuit means including first sensing means for measuring the conductivity of said fluid without said material; a second circuit means including trigger means for changing the concentration of said material in said fluid; second sensing means for measuring the conductivity of said fluid with said material therein; and third circuit means responsive to said second sensing means for controlling said trigger means to bring the concentration selectively to a maximum preselected level and to a minimum preselected level, said third circuit means being further responsive to said first circuit means to adjust said preselected concentration level automatically in accordance with the conductivity of the fluid without the material.

2. In a fabric cleaning device, apparatus for controlling the concentration of a cleaning material in a fabric treating fluid therein, comprising: a first circuit means including first sensing means for measuring the conductivity of said fluid without said material; a second circuit means including trigger means for changing the concentration of said material in said fluid; second sensing means for measuring the conductivity of said fluid with said material therein; and third circuit means responsive to said second sensing means for controlling said trigger means to bring the concentration down to a preselected low level, said third circuit means being further responsive to said first circuit means to adjust said preselected concentration level automatically in accordance with the conductivity of the fluid without the material.

3. The fabric cleaning device of claim 2 wherein said device comprises an automatic clothes washing machine, said material comprises detergent, and said fluid comprises water.

4. In an automatic washing machine having a supply or rinse water, apparatus for controlling the removal of detergent from laundry water therein, comprising: first means for measuring the conductivity of the rinse water; second means for adding rinse water to the laundry water to lower the concentration of the detergent in the laundry water; third means for measuring the conductivity of said laundry water as said rinse water is added thereto; and fourth means responsive to said third means for controlling said second means to lower the concentration to a preselected level, said fourth means being further responsive to said first means to terminate operation of said second means at a preselected detergent concentration level, automatically, regardless of the conductivity of the rinse water.

5. The washing machine of claim 4 wherein said fourth means comprises: means for comparing said measured conductivities to produce a combined signal; and means for comparing said combined signal with the conductivity of said supply water to produce a signal for controlling said second means.

6. A control apparatus for an automatic washing machine having wash and rinse cycles, comprising: means for adding detergent-free water to said machine; first sensing means for developing signals proportional to the conductivity of said detergent-free water; means for adding detergent to said water in the machine; a second sensing means for developing a signal proportional to the conductivity of said water in the machine with the detergent added; a first circuit responsive to each of said sensing means during the wash cycle for controlling the amount of detergent added as a function of the conductivity of the detergent-free water; and a second circuit responsive to each of said sensing means, during the rinse cycle for controlling the amount of detergent-free water added during said rinse cycle.

7. The control apparatus of claim 6 wherein said second circuit includes means for controlling the amount of water added during the rinse cycle as a function of the conductivities of the detergent-free water and the water with detergent added.

8. Apparatus for controlling the condition of laundry water in a washing machine during wash and rinse cycles thereof, comprising: means for adding detergent-free water to the washing machine; means for adding detergent to said detergent-free water to provide said laundry water; means including first and second sensing devices for measuring the conductivity of said detergent-free water; means including a third sensing device for measuring the conductivity of the laundry water in said machine; means coupled to said sensing devices for comparing the conductivity of said detergent-free water and said laundry water to control said detergent adding means as a function of the conductivity of said laundry water and the detergent-free water during the wash cycle; and means coupled to said sensing devices for comparing the conductivity of said detergent-free water and laundry water to control said water adding means as a function of the conductivity of said laundry water and the detergent-free water during the rinse cycle.

9. Apparatus for controlling the condition of laundry water in a washing machine during wash and rinse cycles thereof, comprising: means for adding detergent-free water to the washing machine; means for adding detergent to said detergent-free water to obtain said laundry water; means including first and second sensing devices for measuring the conductivity of said detergent-free water; means including a third sensing device for measuring the conductivity of the laundry water in said machine; relay means for controlling said water adding means and said detergent adding means; and means responsive to signals produced by said conductivity measuring means for operating said relay means selectively to control the amount of detergent added to the detergent-free water in the wash cycle and the amount of detergent-free water added to the laundry water in the rinse cycle.

References Cited by the Examiner

UNITED STATES PATENTS

| 2,430,668 | 11/1947 | Chamberlin | 68—12 |
| 2,859,760 | 11/1958 | Borell | 137—93 |
| 2,874,714 | 2/1959 | Pellerin | 137—93 |
| 3,093,841 | 6/1963 | Cobb et al. | 8—158 |
| 3,099,022 | 7/1963 | Geschka et al. | 8—158 |

WILLIAM F. O'DEA, *Primary Examiner.*

NORMAN G. TORCHIN, *Examiner.*